United States Patent [19]

Kelley, Jr.

[11] 4,275,346

[45] Jun. 23, 1981

[54] STATIC VAR SYSTEM WITH MEANS FOR CORRECTING FOR NEGATIVE PHASE SHIFT

[75] Inventor: Fred W. Kelley, Jr., Media, Pa.

[73] Assignee: General Electric Company, Philadelphia, Pa.

[21] Appl. No.: 99,697

[22] Filed: Dec. 3, 1979

[51] Int. Cl.³ .............................................. H02J 3/18
[52] U.S. Cl. .................................................. 323/210
[58] Field of Search ............... 323/101, 102, 105, 106, 323/108–110, 119–122, 124, 127, 128, 8; 13/12, 13

[56] References Cited

U.S. PATENT DOCUMENTS

| | | | |
|---|---|---|---|
| 3,936,726 | 2/1976 | Kelley, Jr. et al. | 323/24 |
| 3,936,727 | 2/1976 | Kelley, Jr. et al. | 323/102 |
| 3,963,978 | 6/1976 | Kelley, Jr. et al. | 323/119 X |
| 3,968,422 | 7/1976 | Waldmann | 323/119 X |
| 3,968,432 | 7/1976 | Kelley, Jr. | 324/107 |
| 4,135,128 | 1/1979 | Kelley, Jr. | 323/124 |

OTHER PUBLICATIONS

"Operational Amplifiers, Design and Applications," Tobey–Graeme–Huelsman, McGraw-Hill Book Company, 1971.
"Network Analysis and Feedback Amplifier Design", H. W. Bode, Van Nostrand, Princeton, N.J., 1945.

Primary Examiner—William M. Shoop
Assistant Examiner—Peter S. Wong
Attorney, Agent, or Firm—William Freedman; John P. McMahon

[57] ABSTRACT

In an alternating current electric power system of the type subject to rapid load voltage regulation as a result of variations in reactive load current, reactive load current compensation is provided by fixed capacitors and inductors in parallel with the load. The inductors are in series with static switches which are phase controlled to continuously maintain the net reactive compensating current substantially equal and opposite to the reactive components of load currents. Compensation control determines firing time of thyristor switches in accordance with the magnitude of reactive load current. In one embodiment, a signal representative of the condition of the reactive load current is provided with a positive phase shift correction to compensate for a negative phase shift which is provided by the thyristor switching technique.

5 Claims, 16 Drawing Figures

STATIC VAR SYSTEM WITH MEANS FOR CORRECTING FOR NEGATIVE PHASE SHIFT

BACKGROUND OF THE INVENTION

The present invention relates to control of compensating impedance connected to supply leading or lagging reactive current to an a-c electric power system for stabilization of voltage at a critical bus area, and particularly to a control system responsive to rapid current disturbances.

It is known that electric power systems which supply highly erratic reactive loads, e.g., electric arc furnaces, are typically characterized by poor voltage regulation. Consequently, these systems often exhibit an undesirable flicker. One type of regulating system suggested to alleviate this condition is disclosed in U.S. Pat. Nos. 3,936,727 and 3,968,432, respectively issued to Kelley, Jr., et al and Kelley, Jr. on Feb. 3, 1976 and July 6, 1976. These patents are assigned to the assignee of the present application and are hereby incorporated by reference in the present application.

Generally, the above-mentioned regulating system includes the use of two control loops: one open compensating control loop; and one closed regulating or supervisory control loop. The compensating control loop senses the reactive load current component and attempts to negate the same by providing the appropriate compensating reactive current component through a reactive converter which includes capacitive and inductive components. The regulating or supervisory control loop employs a current angle sensor to sense the power factor or phase angle at a selected line location which is typically located in a critical area of the line at which good voltage regulation is desired. These two loops cooperate to generally provide a satisfactory degree of voltage regulation when an erratic load is present.

One problem with such a regulating system arises because the reactive converter in the system typically includes thyristor switching for controlling the current which passes through the inductive components. The thyristor switching involves triggering the thyristor switches into conduction at an appropriate gating angle ($\alpha$), i.e., the phase angle with respect to the impressed alternating voltage wave at which each thyristor is triggered into conduction. The interval during which the thyristor subsequently conducts following each triggering is referred to as the conduction angle ($\sigma$). When the conduction angle ($\sigma$) is substantially 180° for each thyristor, the switch is considered to be fully "on" or closed; when the conduction angle ($\sigma$) is substantially 0°, the switch is considered to be fully "off" or open. At intermediate conduction angles ($\sigma$), and correspondingly intermediate gating angles ($\alpha$), the switch is partially "on" and partially "off" during each half cycle and controls the amount of current flowing therethrough by the ratio of "on" time to "off" time. Once the current is initiated by gating the thyristors, current will flow for the whole half cycle if conduction is initiated at the peak of the voltage wave. Current can be changed every half cycle by control of the gating angle. Current conduction stops at every current zero and is reinitiated at the current level required by reapplication of the gate signal.

The correction provided to the power system by a change in thyristor switching may be viewed as a two-part correction. For example, advancing the gating angle ($\alpha$) by $\Delta\alpha$ degrees initiates conduction by $\Delta\alpha$ degrees earlier in the waveform cycle and also delays the end of conduction by $\Delta\alpha$ degrees, thus effecting a change in the conduction angle ($\sigma$) of two times $\Delta\alpha$ degrees. The geometric centroid of the conduction angle change is delayed from the gating event by half the conduction angle. This conduction angle change is determined by the control information at the instant of thyristor gating. In this connection, if the thyristor switch output is modulated by the gating control at a frequency somewhat less than power system frequency, the modulation of the output will lag the gating control modulation by approximately half the conduction angle. This lag comprises a frequency plane negative phase shift which reduces the effectiveness of the reactive converter in correcting the effects of load disturbances on the power system.

Accordingly, a general object of this invention is to provide an improved regulating system for use in an a-c electric power system wherein the regulating system includes a thyristor switched static converter.

Another object of this invention is to provide such a regulating system wherein the effectiveness of the thyristor switched reactive converter is improved by providing means for correcting for the negative phase shift produced in the thyristor switch.

Another object of this invention is to provide such a regulating system wherein the means for correcting for the negative phase shift includes positive phase shift means.

SUMMARY OF THE INVENTION

In carrying out one form of my invention, an a-c power system is provided with a regulating system involving the compensation of reactive current drawn by a load through the use of a reactive converter which can deliver to the system leading or lagging compensating current which is substantially equal and opposite to the reactive load current. Compensation of the reactive load current includes means for developing a signal representative of the magnitude and polarity of the reactive load current coefficient and directing this signal to the control means for the reactive converter which responds to the signal to vary the leading or lagging compensating current delivered by the reactive converter. Means are provided for receiving the signal representative of the reactive load current coefficient and developing an intermediate signal which is of substantially the same frequency as the reactive load current coefficient signal but has a predetermined positive phase shift with respect to frequency relation thereof. The intermediate signal is directed to the control means and the reactive converter responds thereto.

BRIEF DESCRIPTION OF THE DRAWINGS

My invention will be better understood and its various objects and advantages will be more fully appreciated from the following description taken in conjunction with the accompanying drawings in which:

FIGS. 4A and 4B are highly simplified schematic representations of the manner in which a reactive converter system is employed to provide compensating reactive current. FIG. 4A represents a prior art reactive converter with an uncorrected negative phase shift while FIG. 4B represents a reactive converter which is provided with a positive phase shift correction ($+\phi$).

DETAILED DESCRIPTION OF THE INVENTION

Figure 1:
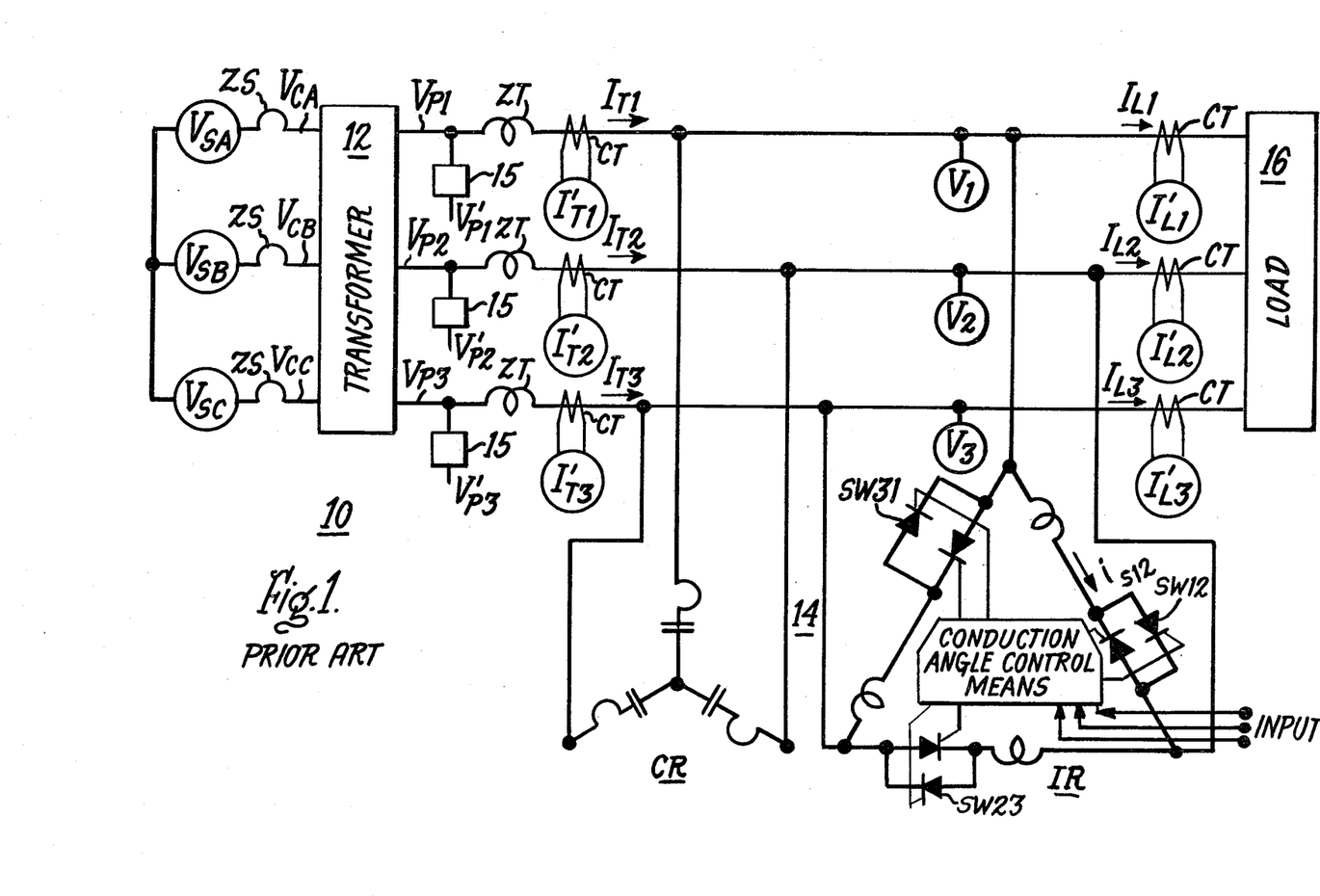
FIG. 1 is a highly schematic representation of one form of an a-c electric power system network of the prior art to which the present invention relates. The network includes a reactive converter, i.e., a static var system, for reducing load disturbance effects at a critical bus area.

Referring initially to FIG. 1, a prior art a-c electrical power system, including a reactive converter 14, i.e., static var system, for minimizing reactive load disturbance effects, is generally designated 10. The power system 10 includes system voltage sources, designated $V_{SA}$, $V_{SB}$, and $V_{SC}$, each of which represents the line to neutral voltage of one phase of a three phase power system. Each phase further includes a critical bus area at which good voltage regulation is required. The line to neutral voltages at the critical bus area are respectively designated, $V_{CA}$, $V_{CB}$, $V_{CC}$. A system reactance, designated ZS, separates the system voltage sources ($V_{SA}$, $V_{SB}$, $V_{SC}$) from the critical line to neutral bus voltages ($V_{CA}$, $V_{CB}$, $V_{CC}$). A conventional transformer 12 is disposed in the system 10 and produces reactances designated ZT. The transformer 12 connects the critical bus voltages ($V_{CA}$, $V_{CB}$, $V_{CC}$) to a load bus, with voltages designated $V_1$, $V_2$, $V_3$. The load bus ($V_1$, $V_2$, $V_3$) supplies the reactive converter 14 and a load 16.

The reactive converter 14 includes a controlled inductive converter and at least one tuned capacitor bank, respectively designated IR and CR. The reactive converter 14, as well as the other elements of FIG. 1 are more completely described in previously mentioned U.S. Pat. Nos. 3,936,727 and 3,968,432, which have been incorporated by reference into the present application.

The electrical power system 10 includes means for generating electrical signals representative of various electrical characteristics, e.g., current and voltage. One such signal, designated $V'_{P1}$, $V'_{P2}$, $V'_{P3}$ is representative of the projected voltage, i.e., a voltage representative of the line to neutral voltage at the critical bus which takes into account correction required for the reactive effect of the transformer 12. These signals may be obtained through processing means 15 in accordance with U.S. Pat. No. 3,936,727, see especially FIGS. 1 and 3, and column 7, lines 14–37.

The power system 10 also includes means for generating electrical signals representative of current characteristics. Current transformers, designated CT, are provided for this purpose. As shown in FIG. 1, current transformers (CT) are provided at locations in the system 10 so as to generate signals representative of the transformer line current, respectively designated $I'_{T1}$, $I'_{T2}$, $I'_{T3}$, as well as the load current, respectively designated $I'_{L1}$, $I'_{L2}$, $I'_{L3}$. For clarity of description, the representative signals are distinguished from the actual current or voltage value by the inclusion of a prime ('), e.g., $I_{L1}$ and $I'_{L1}$. In connection with the current transformers (CT), the step down ratio is designated T so that the representative current signal $I'_L$ or $I'_T$ is related to the transformer current $I_T$ or load current $I_L$ by the ratio of $T = I/I'$.

Generally, in the operation of the prior art electrical power system 10 of FIG. 1, load disturbances are attenuated through the operation of the reactive converter 14. The reactive converter 14 is activated via Conduction Angle Control Means by signal inputs, simply designated INPUT, representative of the coefficients of the reactive components of the load currents. A preferred form of Conduction Angle Control Means is discussed in U.S. Pat. No. 3,936,726, issued Feb. 3, 1976 to F. W. Kelley, Jr., entitled, "Gating Control For A Static Switching Arrangement With Improved Dynamic Response". The reactive converter 14 receives these inputs, designated INPUT, and, via Conduction Angle Control Means, produces an output which attempts to negate each of the reactive load current components by providing the appropriate compensating reactive current component through its IR and CR networks. A preferred system includes means for developing such INPUT signals to the reactive converter wherein the INPUT signals are representative of the reactive load current condition at greater than two times each cycle of source frequency. Such a preferred system is discussed in my U.S. Pat. No. 4,135,128 entitled, "Apparatus For Sensing the Reactive Or Real Components of Current", which is hereby incorporated by reference into the present application.

In accordance with one preferred form of the present invention, I employ, and further process, the previously mentioned INPUT signals which correspond to the continuous condition of the reactive load currents. That is, the INPUT signals have a magnitude and polarity corresponding to the continuous condition of the reactive load current with the polarity of the signals depending upon whether the reactive component of load current is lagging (inductive) or leading (capacitive). These INPUT signals may be developed through the signal processing means described in my above-mentioned U.S. Pat. No. 4,135,128. For purposes of clarity, such INPUT signals for phases A, B, C will simply be identified as $I'_{JA}$, $I'_{JB}$, $I'_{JC}$, respectively corresponding to the designation $I'_{J1}$, $I'_{J2}$, $I'_{J3}$ employed in my U.S. Pat. No. 4,135,128 (see FIGS. 2 and 3 therein).

Referring now to FIGS. 2A–2C herein, functional block representations of exemplary signal processing networks for use in one form of the present invention are shown. In FIGS. 2A–2C, such signal processing networks, generally designated 20, are shown for each phase of a three-phase a-c electrical power system. Each such signal processing network 20 receives the above-described appropriate INPUT signal, $I'_{JA}$, $I'_{JB}$, $I'_{JC}$, and develops an output signal, $I_{JA}$, $I_{JB}$, $I_{JC}$, which is substantially identical to its respective INPUT signal but which has a frequency plane positive phase shift relation with respect thereto. By a frequency plane positive phase shift relation, it is meant the advance in phase of output signal with respect to input signal that occurs under steady state conditions when an INPUT signal sinusoid engenders a same frequency output signal that is advanced in phase with respect to the INPUT signal sinusoid.

The networks 20 each preferably include attenuation circuit means 22 for reducing the harmonic structure of the processed signals above a predetermined frequency which may be of the order of source frequency or higher. Preferably, the attenuated signal outputs of the attenuation circuits 22 are respectively directed to notch filters 24 for attenuating harmonics which result from characteristic harmonic generation by the load which may occur in some applications, e.g., arc furnace applications. The now-attenuated and now-filtered signal outputs of the notch filters 24, i.e., I'$_{JA\ (filtered)}$, I'$_{JB\ (filtered)}$, I'$_{JC\ (filtered)}$, are respectively directed to lead networks 26, and to gain correction circuits 28 which process the signals to develop output signals, I$_{JA}$, I$_{JB}$, I$_{JC}$, which are substantially identical to the respective input signals I'$_{JA}$, I'$_{JB}$, I'$_{JC}$, but which have a frequency plane positive phase shift relation thereto.

The frequency plane positive phase shift characteristic may involve a slight increase in gain over the frequency spectrum up to the maximum response frequency. Accordingly, the gain means 28 is preferably adjusted to make the average gain over the frequency spectrum equal to the desired gain. Thus, the gain may be slightly low at low frequency and slightly high at maximum response frequency. However, at such low frequency, the regulating loop will provide correction for the slight gain deficiency of the compensating loop.

Figure 2:
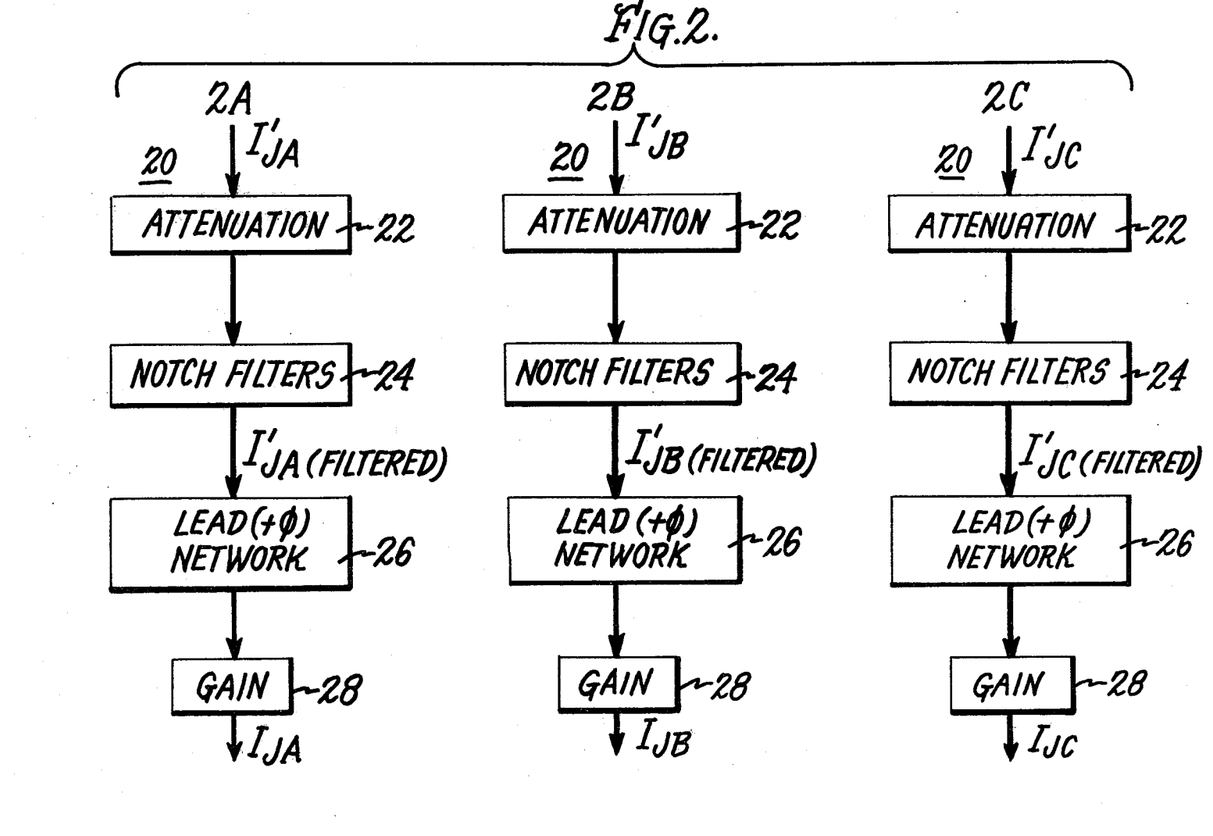
FIGS. 2A–2C are functional block representations of exemplary signal processing networks suitable for use in one form of the present invention. The networks generate phase-shifted output signals $I_{JA}$, $I_{JB}$, $I_{JC}$ respectively representative of the continuous phase relation and magnitude of the reactive load currents in separate phases of a three phase a-c power system.
Figures 3, 3A:
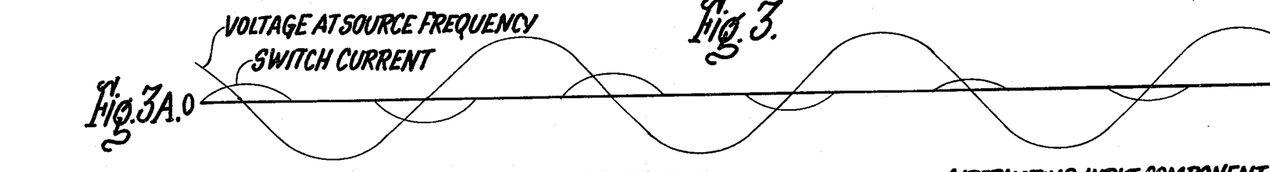
FIGS. 3A–3I are representations of exemplary wave forms which may be associated with the signal processing networks of FIGS. 2A–2C.
Figures 3B, 3C:
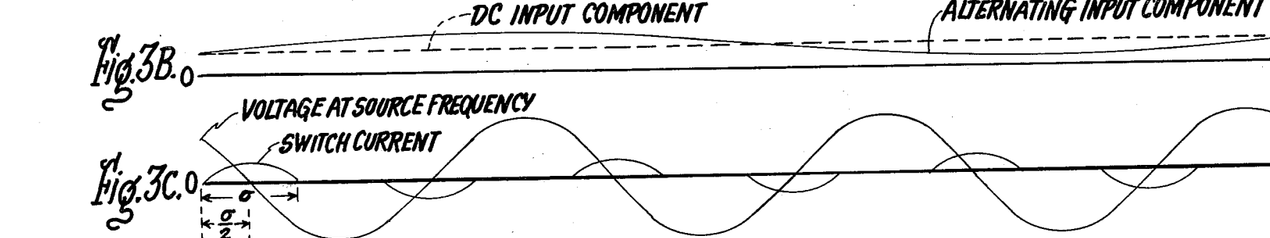
Figure 3D:
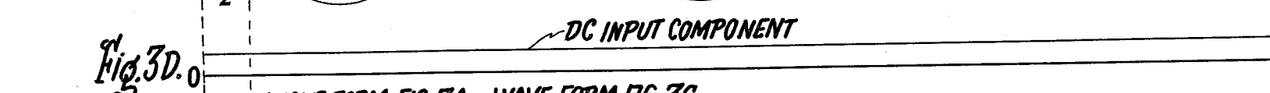
Figure 3E:
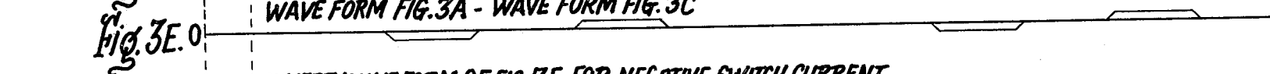
Figures 3F, 3G:
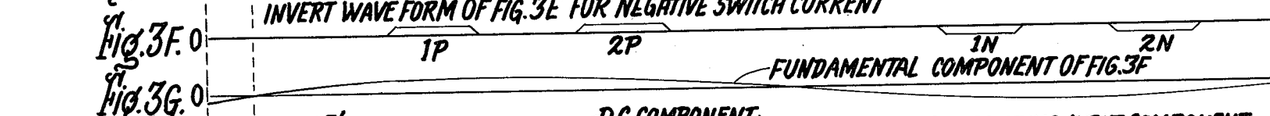
Figure 3H:
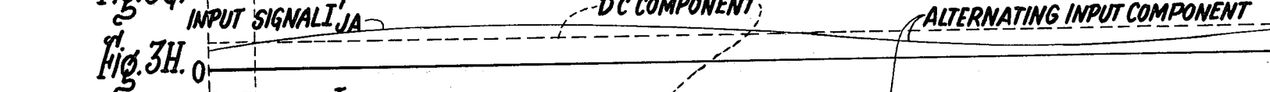
Figure 3I:
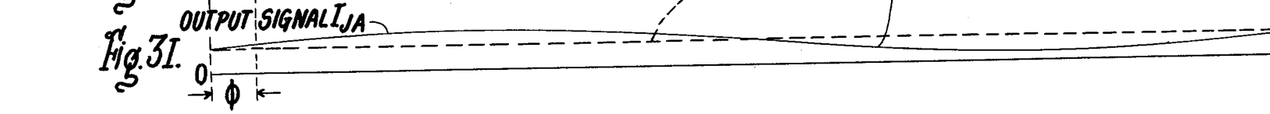

In order to better appreciate the operation of the signal processing means 20 of FIGS. 2A-2C, it is helpful to refer to FIGS. 3A-3I. FIGS. 3A-3I are representations of waveforms associated with the signal processing means 20 for an exemplary input signal. I'$_{JA}$, shown in FIG. 3H, which is representative of the continuous condition of the coefficient of the phase A load reactive current. Output signal I$_{JA}$ is shown in FIG. 3I. Comparing the output signal I$_{JA}$ of FIG. 3I to the input signal I'$_{JA}$ of FIG. 3H, it can be seen that the two signals are substantially identical in magnitude and frequency but, output signal I$_{JA}$ of FIG. 3I has a positive phase shift relation, designated $+\phi$, with respect to its input signal I'$_{JA}$ of FIG. 3H. For the exemplary case shown, the time-span of the positive phase shift relation ($\phi$) is equal to the time-span of one-eighth of the period of source frequency.

The purpose of providing the positive phase shift ($+\phi$) will now be discussed through reference to FIGS. 3A-3G. FIGS. 3A-3G are intended to show the response of an inductively loaded thyristor switch to an input signal comprised of a dc component plus an alternating component that, for the purpose of simplicity, has been chosen as being one-third source frequency. For the purpose of illustration, it is assumed that the relationship of the fundamental component of switch current to the input signal is linear as described in previously mentioned U.S. Pat. No. 3,936,726.

FIG. 3B shows the composite of a dc input signal component plus an alternating input signal component by the solid line and the dc input signal component only by the dashed line. FIG. 3A shows the ac voltage supply (for example V$_1$-V$_2$ of FIG. 1) and the switch current (for example i$_{s12}$ of FIG. 1). FIGS. 3C and 3D are related to FIGS. 3A and 3B for the case in which the alternating input signal component has been removed. Subtracting the switch current wavetrain of FIG. 3C from that of the FIG. 3A gives the change in the switch current wavetrain due to the alternating input signal component and is illustrated by FIG. 3E. For the purpose of evaluating the relationship of the switch current modulation to the alternating input signal, the changes in the switch current wavetrain associated with negative switch current are inverted as shown by FIG. 3F. The pulse centroids of the FIG. 3F wavetrain are coincident with the voltage wavetrain zero crossings so that, if pulses 1P and 2P are identical and pulses 1N and 2N are identical, the fundamental (alternating) component of the FIG. 3F wavetrain, illustrated by FIG. 3G, is displaced from the alternating input signal component by one-half of the switch conduction interval related to the dc component of input signal shown by FIGS. 3C and 3D. The pulse pair differences are very small so that the one-half conduction interval displacement between the input alternating, or modulating signal component, and the output alternating or modulated component, is a good approximation.

For the situation illustrated by FIG. 3C, the switch conduction interval ($\sigma$) is one-quarter of the period of source frequency. It is noted that, if the required modulation data is as illustrated by FIG. 3H, and the dynamic processing of this data results in the waveforms of FIGS. 3I, then the output modulation illustrated by FIG. 3G is in phase with the required modulation data of FIG. 3H, thus effecting a desired correction.

The negative phase shift angle ($\theta$) for a modulating frequency (fm) can be approximately expressed in terms of source frequency (fs) and the half conduction angle $$\left(\frac{\sigma}{2}\right)$$

associated with the dc component of input signal for the inductively loaded thyristor switch. More particularly, $$\theta = -\frac{fm}{fs} \times \frac{\sigma}{2}.$$

The limits of the variation of the conduction angle ($\sigma$) are $0 \leq \sigma \leq \pi$ in radians for the thyristor switch arrangements of FIG. 1. To reduce the angular deviations due to conduction angle control, the average value of the conduction angle limits may be employed. Letting $$\sigma_{(average)} = \frac{\pi}{2} \text{ radians,}$$

the positive phase shift for the signal processing networks 20 of FIG. 2 is expressed $$\phi = +\frac{fm}{fs} \times \frac{\pi}{4} \text{ radians.}$$

If operation of the thyristor switches is usually at a predetermined conduction angle other than $$\frac{\pi}{2} \text{ radians,}$$

an appropriate adjustment of the dynamic processing network angle ($\phi$) can be made.

Figure 4A:
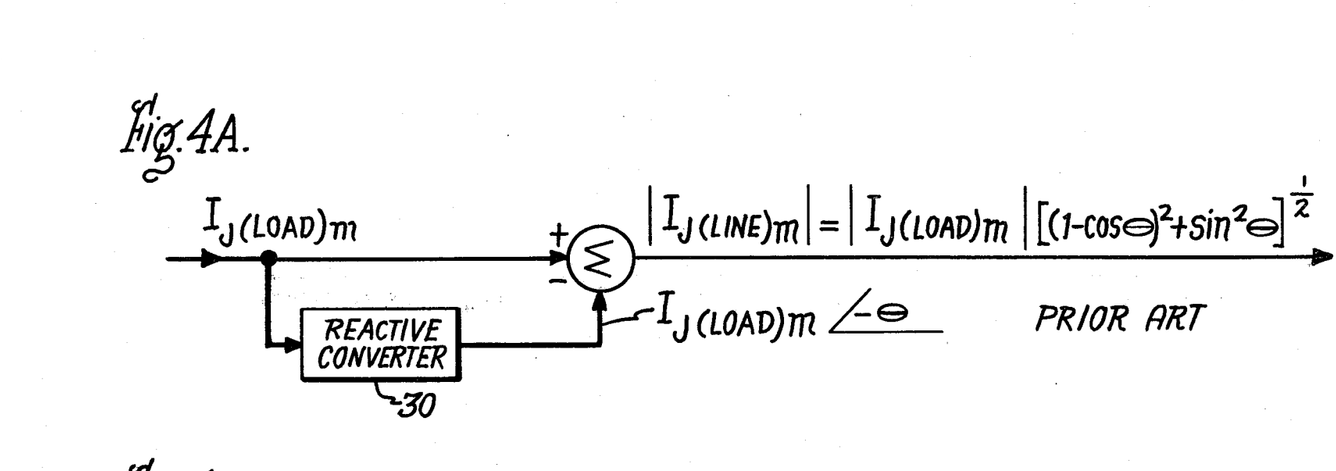
Figure 4B:
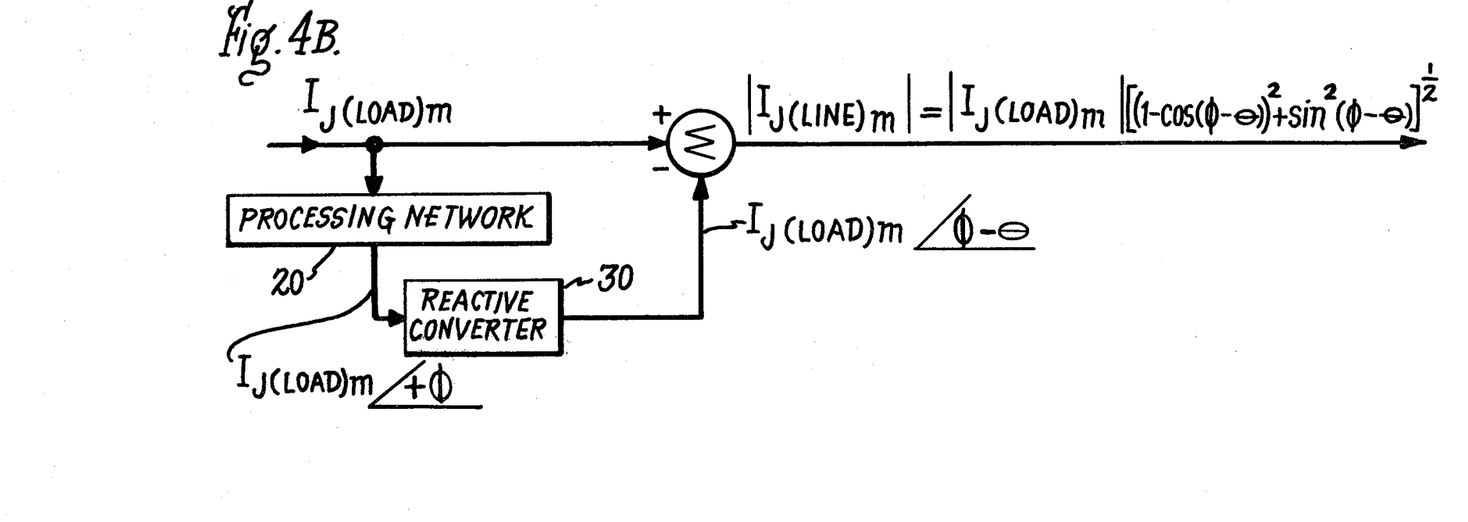

The significance of the displacement, or negative phase shift angle, ($\phi$) and the signal processing network positive phase shift ($+\phi$) can be better appreciated through reference to FIGS. 4A and 4B which depict, in highly simplified form, the manner in which the reactive converter system, generally designated 30, and the processing network, generally designated 20, are employed to provide compensating current. FIG. 4B employs the positive phase shift processing network with the reactive converter while in the FIG. 4A, only the reactive converter compensation is used. Since the phase shifts do not effect the nonmodulated reactive current components, the compensation for these components is correct in both Figures and they are omitted from FIGS. 4A and 4B. Only the modulated component of reactive load current coefficient $I_{j\,(load)\,m}$ and the magnitude of the modulated component of reactive line current coefficient, $I_{j\,(line)\,m}$, are illustrated since these are the parameters of interest which are influenced by compensating loop phase shift. The reactive converter system illustrated by FIG. 4A illustrates prior art while the system illustrated by the FIG. 4B incorporates one form of the present invention.

EXAMPLES

Consider now the following examples in connection with FIGS. 4A and 4B for the case that $$\phi = +\frac{fm}{fs} \times \frac{\pi}{4} \text{ radians.}$$

EXAMPLE 1

$fs = 60$ hz.
$fm = 20$ hz.
$\sigma = \pi/2$ radians for FIG. 4A system $\theta = -\frac{20}{60} \times \frac{1}{2} \times \frac{\pi}{2} = -\frac{\pi}{12}$ $$\therefore \frac{|I_{j(line)m}|}{|I_{j(load)m}|} = 0.261$$

for FIG. 4B system $\theta = -\frac{\pi}{12}$ ; $\phi = +\frac{\pi}{12}$ $$\therefore \frac{|I_{j(line)m}|}{|I_{j(load)m}|} = 0$$

EXAMPLE 2

$fs = 50$ hz.
$fm = 15$ hz.
$\sigma = 2\pi/3$ radians for FIG. 4A system $\theta = -\frac{15}{50} \times \frac{1}{2} \times \frac{2\pi}{3} = -\frac{\pi}{10}$ $$\therefore \frac{|I_{j(line)m}|}{|I_{j(load)m}|} = 0.313$$

for FIG. 4B system $\theta = -\frac{\pi}{10}$, $\phi = +0.075\pi$ $$\therefore \frac{|I_{j(line)m}|}{|I_{j(load)m}|} = 0.079$$

EXAMPLE 3

$fs = 50$ hz.
$fm = 15$ hz.
$\sigma = \pi/4$ radians for FIG. 4A system $\theta = -\frac{15}{20} \times \frac{1}{2} \times \frac{\pi}{4} = -0.0375\pi$ $$\therefore \frac{I_{j(line)m}}{I_{j(load)m}} = 0.118$$

for FIG. 4B system $\theta = -0.0375\pi$, $\phi = +0.075\pi$ $$\therefore \frac{I_{j(line)m}}{I_{j(load)m}} = 0.118$$

Reviewing the examples, it follows that if the conduction angle ($\sigma$) is greater than $\pi/4$ radians, the $\phi$ relationship chosen improves the compensation of a modulated coefficient of load reactive current. It is to be noted that, at a conduction angle ($\sigma$) equal to $\pi/4$ radians, the fundamental component of thyristor switch current is less than 2.5% of the full "on" thyristor switch current. In substance, the $\sigma_{(average)}$ is substantially greater than $\pi/4$ radians and thus the "frequency plane" phase lead characteristic of the processing networks of FIG. 2 will engender substantially improved average compensation for the time varying coefficient of the reactive current component.

The average conduction angle $\sigma_{(average)}$ is a variable with various applications. In some instances, it may be of the order of $\pi/2$ radians, and in other instances it may be more nearly of the order of $5\pi/8$ radians. It follows, however, that, in carrying out the present invention a precise correction to the average conduction angle is not essential to engendering effective improvement due to the positive phase shift characteristic. In this connection, a band of positive phase shift will exist with respect to the average conduction angle that is effective for the purpose of providing substantial improvement over the case of no positive phase shift correction. This band is described by the relationship:

$$\frac{fm}{fs} \times \frac{\pi}{6} \leq \phi \text{ in radians} \leq \frac{fm}{fs} \times \frac{5\pi}{12}$$

This relationship assumes that the correction angle ($\phi$) can vary by ±33% from the value associated with the average conduction angles of $\pi/2$ and $\frac{5}{8}\pi$ radians.

It should also be pointed out that the attenuation and notch filter networks 22, 24 of FIGS. 2A–2C typically exhibit some "frequency plane" negative phase shift in the frequency spectrum below the maximum response frequency. Accordingly, the positive phase lead network 26 preferably includes phase correction for these networks such that the phase lead angle ($\phi$) represents the composite phase characteristic of networks 22, 24, and 26. It should also be pointed out that such attenuation and notch filters 22 and 24, although preferable, are not essential to practice the present invention.

Figure 5:
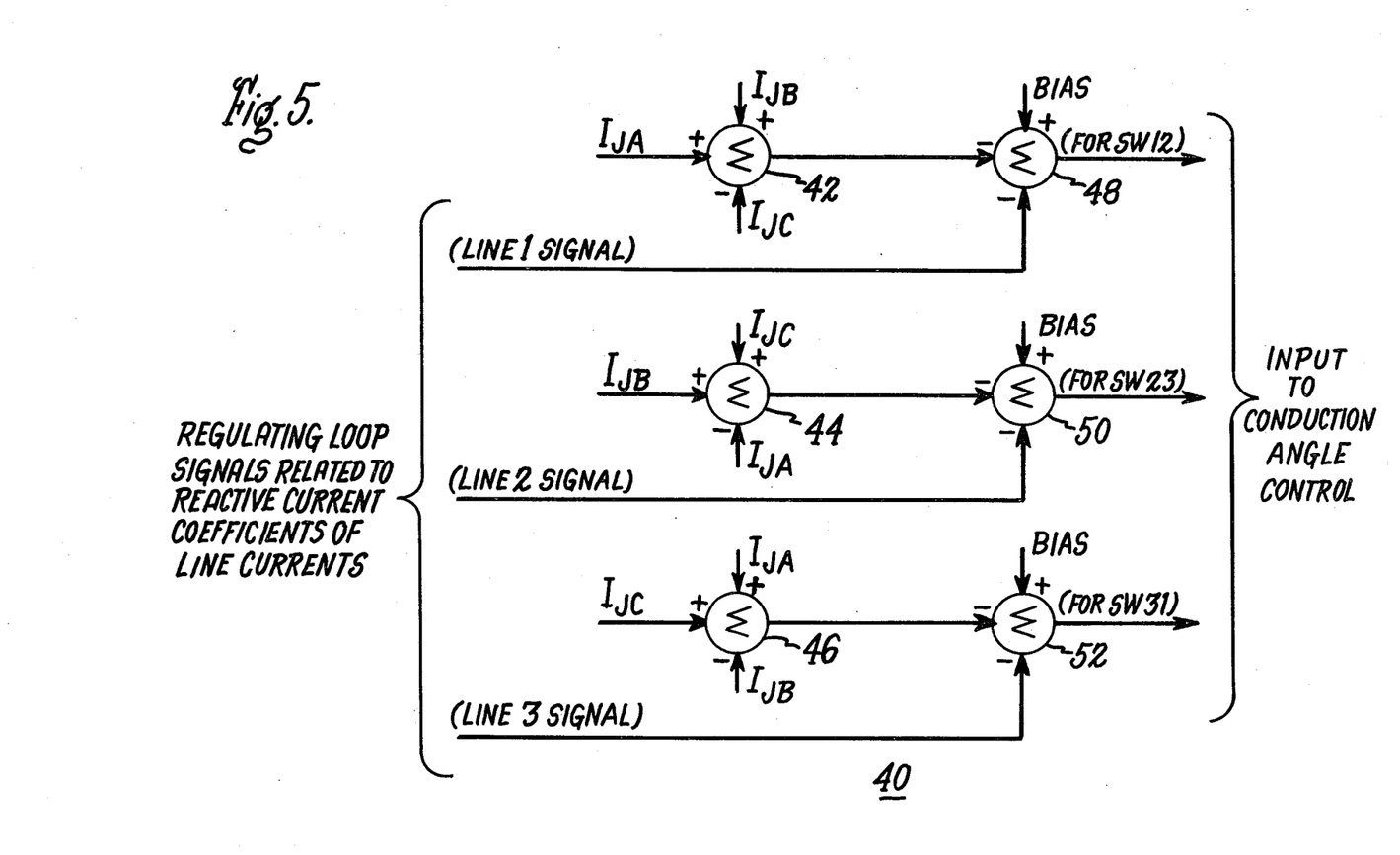
FIG. 5 is a functional block diagram showing a manner in which the signal processing networks 20 of FIGS. 2A–2C may be coupled to the Conduction Angle Control Means of FIG. 1.

Referring to FIG. 5, a functional block diagram is shown which depicts a signal processing network, generally designated 40, suitable for use in coupling the signal processing networks 20 of FIGS. 2A–2C to the Conduction Angle Control Means of FIG. 1. More particularly, first summation devices 42, 44, 46 receive the positive phase shifted signals $I_{JA}$, $I_{JB}$, $I_{JC}$. Outputs of summation devices 42, 44, 46, are respectively directed to second summation devices 48, 50, 52. Summation devices 48, 50, 52 each receive BIAS input signals through positive summing inputs and regulating loop signals, which are related to the reactive current coefficients associated with lines 1, 2, and 3, through negative summing inputs. The outputs of summation devices 48, 50, 52 respectively control thyristor switches SW12, SW23, SW31. These outputs are shown in FIG. 1 as INPUT to Conduction Angle Control Means.

In connection with the construction of the signal processing means hereinbefore discussed, well known techniques are available. A useful guide for suitable signal processing means is *OPERATIONAL AMPLIFIERS, Design and Applications*, Tobey-Graeme-Huelsman, McGraw-Hill Book Company, 1971. Additional reference materials include *NETWORK ANALYSIS AND FEEDBACK AMPLIFIER DESIGN*, H. W. Bode, Van Nostrand, Princeton, N.J. 1945.

While the present invention has been described with reference to specific embodiments thereof, it will be obvious to those skilled in the art that various changes and modifications may be made without departing from the invention in its broader aspects. It is contemplated in the appended claims to cover all such variations and modifications of the invention which come within the true spirit and scope of our invention.

What is claimed as new and desired to be secured by Letters Patent of the United States is:

1. Reactive current supply apparatus for an a-c electric power system including a critical voltage supply bus electrically separated by series impedance from load terminals which are adapted for connection to a load subject to rapid oscillatory variation of reactive current demand comprising: fixed capacitor means connected across said load terminals, fixed inductor means connected across said load terminals in series circuit relation with static switching means, said static switching means including gating means for phase controlling the conduction angle of said switching means thereby to control the magnitude of reactive current traversing said inductor means; means for developing a first electrical signal representative of the magnitude and polarity of the reactive load current coefficient at said load terminals, second means responsive to said first electrical signal for so controlling said gating means for determining the sum of the reactive current traversing said fixed capacitor means and said fixed inductor means, which further comprises:

means for receiving said first electrical signal and developing a first intermediate electrical signal of substantially the same frequency as said first electrical signal but having a predetermined positive phase shift relation thereto, said second means being responsive to said first intermediate electrical signal.

2. Reactive current supply apparatus in accordance with claim 1 in which said predetermined positive phase shift has a magnitude of (fm/fs) x K in radians, where fm represents modulating frequency in hertz and fs represents source frequency in hertz, and K is a value between $\pi/6$ and $5\pi/12$.

3. The reactive current supply apparatus of claim 2 in which K is a value between $5\pi/24$ and $9\pi/24$.

4. The reactive current supply apparatus of claim 3 in which K is a value of about $\pi/4$.

5. The reactive current supply apparatus of claims 1, 2, 3, or 4 in which the sum of the reactive current traversing said fixed capacitor means and said fixed inductor means is substantially equal and opposite to said reactive component of load current.

* * * * *